(12) United States Patent  
Russick et al.

(10) Patent No.: US 6,644,640 B1  
(45) Date of Patent: Nov. 11, 2003

(54) QUICK CONNECT/DISCONNECT WORKPIECE TRANSFER UNIT

(75) Inventors: Aaron Thomas Russick, Charlotte, NC (US); Steven Mark Sunday, Rothbury, MI (US); Larry Richard Erdman, Montague, MI (US); Jeffrey Boyd Grimshaw, Montague, MI (US); Daniel D. Minor, Cadillac, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 114 days.

(21) Appl. No.: 10/060,703

(22) Filed: Jan. 30, 2002

(51) Int. Cl.[7] ............................................... B23Q 1/08
(52) U.S. Cl. ....................................................... 269/309
(58) Field of Search ................................. 269/309, 310, 269/56, 900; 29/559, 563, 464, 33 P, 271; 33/180 R; 198/345

(56) References Cited

U.S. PATENT DOCUMENTS

| | | | |
|---|---|---|---|
| 5,125,149 A | | 6/1992 | Inaba et al. |
| 5,220,718 A | | 6/1993 | Speller, Sr. et al. |
| 5,415,384 A | * | 5/1995 | Obrist et al. ................. 269/309 |
| 5,493,767 A | | 2/1996 | Susnjara |
| 6,024,354 A | * | 2/2000 | Yonezawa .................... 269/309 |
| 6,485,214 B2 | * | 11/2002 | Schill ........................... 269/309 |
| 6,527,266 B1 | * | 3/2003 | Yonezawa et al. ........... 269/309 |
| 6,532,861 B2 | * | 3/2003 | Etter ............................ 269/309 |

* cited by examiner

Primary Examiner—Robert C. Watson
(74) Attorney, Agent, or Firm—MacMillan, Sobanski & Todd, LLC

(57) ABSTRACT

A flexible manufacturing line and manufacturing process employs an overhead gantry system to transfer fixtured workpieces between machining stations served by the gantry system. The manufacturing system includes a fixturing system including a transfer unit specially configured for quick connection and quick disconnection from a machining table. An accurate placement of the transfer unit is achieved using a combination of locating features.

10 Claims, 12 Drawing Sheets

QUICK CONNECT/DISCONNECT WORKPIECE TRANSFER UNIT

BACKGROUND OF THE INVENTION

The present invention relates in general to the machining of parts or workpieces by a plurality of machining stations using transfer units or fixtures transported by a gantry system, and, more specifically, to such a transfer unit or fixturing system providing quick, automated connects and disconnects with a machining station.

In the manufacturing of certain cast metal products, it is not possible to achieve the final part shape and tolerances by casting alone. Part manufacture usually includes several machining operations that must be applied to the original casting, such as drilling, boring, milling, cutting, and tapping. Products of this type include engine manifolds, wheels, brake rotors, and suspension components such as steering knuckles, control arms, and cross members.

In mass production, it is necessary to organize a manufacturing process with high reliability, short cycle times, easy maintenance, and worker safety while minimizing cost and space requirements. It is also highly desirable to achieve flexibility of the manufacturing process and the manufacturing equipment so that the process and equipment can be adapted at low cost to changes in part design, part mix, or part quantities.

Manufacturing systems utilizing automation are preferred because of increased consistency and reduced time and cost. Automated machining stations typically receive a workpiece (e.g., an unfinished casting) mounted on a fixture (also called a pallet) and automatically perform the desired machining operations on the workpiece. The workpieces may be delivered to and removed from the machining station either manually or automatically by a conveyance.

Various types of machining stations are known. Dedicated stations are constructed to perform a fixed set of operations and cannot be easily adapted to perform other tasks. Dedicated stations usually have a cost advantage when a large volume of parts is to be made and no significant design changes are to occur during a long production run. Another type of station is the computer-numerically-controlled (CNC) machine, which is programmable to perform a variety of machining operations and has advantages of being able to produce parts with a lower number of machining stations and therefore requiring less relocation of a workpiece during manufacture. In addition, CNC machines are more easily adapted to new products or processes and can reduce overall capital investment for a changeover. A typical CNC machine has programmable multidimensional movement of both the tool head and the table that receives the fixture and workpiece.

An especially adaptable type of CNC machine is the flex turret cell which employs a multi-spindle head that automatically reconfigures itself to use selected ones of several tools contained on the multi-spindle head. The multi-spindle head usually comprises a gearbox with multiple output shafts (a different tool on each shaft) driven by a common input shaft. The head is indexed between separate operations while a workpieces remains at the machining station, which improves cycle time and accuracy.

Nevertheless, previous automated systems have suffered from various drawbacks. For example, transfer of workpieces between work stations has remained labor intensive, slow, and/or inflexible (i.e., not easily adaptable to process changes or substitutions). A single workpiece may need to be swapped between various fixtures corresponding to different machining stations when the particular set of machining operations to be performed on the workpiece occurs at several different machining stations. Overall accuracy suffers due to a loss of an exact registration in a reference position between fixtures. Another disadvantage has been the inaccessibility of the CNC machines during operation, making observation and maintenance more difficult.

These disadvantages are overcome by the present invention.

SUMMARY OF THE INVENTION

It is an object and advantage of the present invention to provide a transfer unit with quick connect and disconnect for a flexible manufacturing line and manufacturing process providing flexibility and adaptability to variation, improved maintenance of reference position on the fixture during manufacture, improved accessibility to machining stations during operation, and increased safety.

In one aspect, the present invention provides a quick-connect fixturing system for automated manufacturing comprising a transfer unit for holding a workpiece and a machining table for securing the transfer unit at a machining station. The transfer unit includes 1) a plate having a bottom side with a first radial locating feature and a first z-axis locating pad, 2) a shank extending from the bottom side of the plate and having a retention stud, the shank having a shank registration taper, 3) at least one clamp for holding the workpiece, and 4) at least one pick-up extension by which the transfer unit is lifted and carried. The machining table includes 1) a trap for receiving the shank and having a trap registration taper to mate with the shank registration taper, 2) a second radial locating feature to mate with the first radial locating feature, 3) a second z-axis locating pad to mate with the first z-axis locating pad, and 4) a retention mechanism for securing the retention stud so that the transfer unit is located in a predetermined reference position.

DETAILED DESCRIPTION OF PREFERRED EMBODIMENTS

Figure 1:
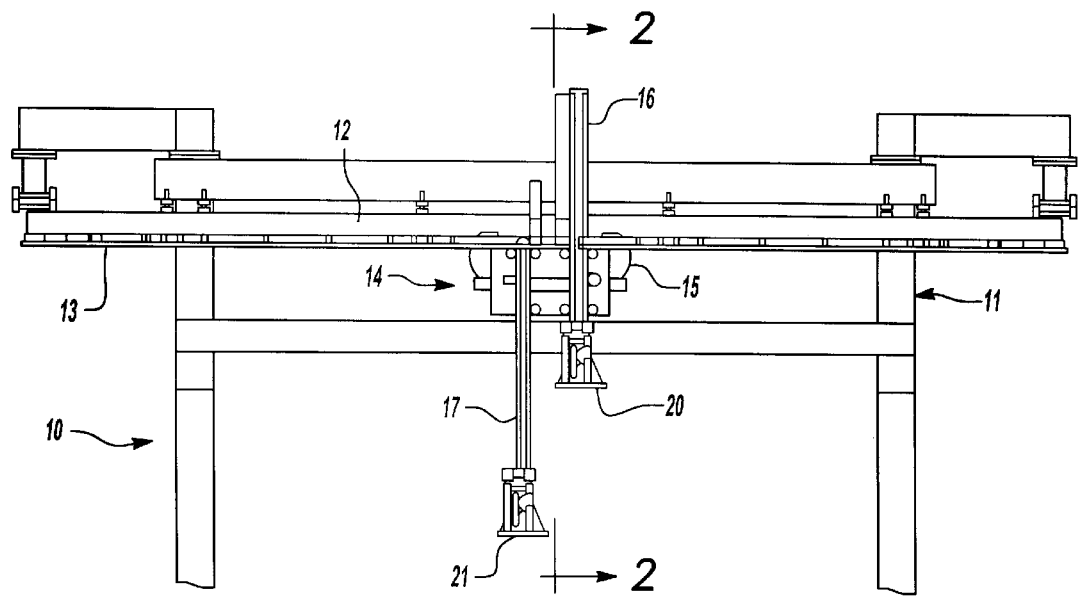
FIG. 1 is a front, plan view of a gantry system used in a preferred embodiment.
Figure 2:
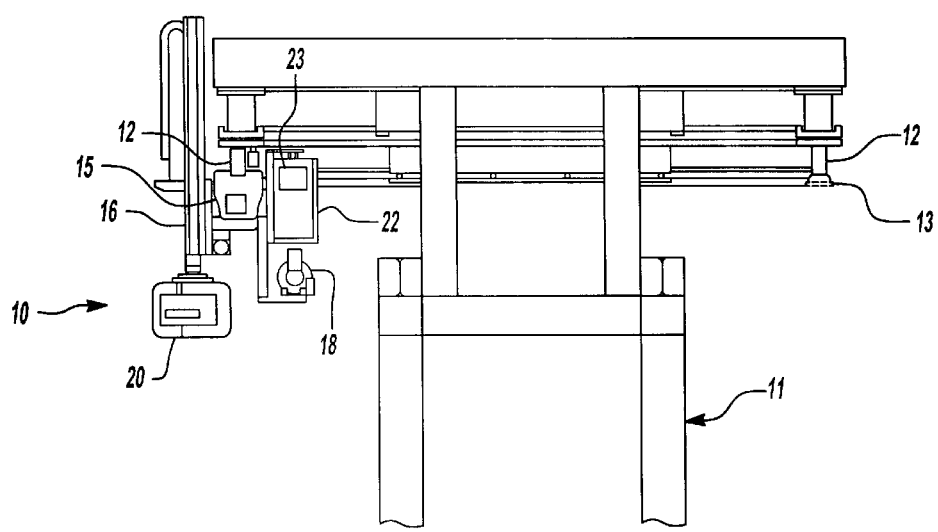
FIG. 2 is a side, plan view of the gantry system of FIG. 1.

Referring to FIGS. 1 and 2, a gantry system 10 is used in the present invention to transfer fixtures and the workpieces mounted thereon between machining stations. Preferably, gantry system 10 is constructed to primarily convey the fixtures and workpieces in an overhead manner. Gantry system 10 may for example be comprised of a roboLoop system sold by Gidel AG of Langenthal, Switzerland. The roboLoop system is a gantry, transfer, and carrier system that may be laid out with straight lines and curves. It is modular so that sections can be easily added or removed when expanding or reconfiguring a manufacturing operation based on changed needs.

Gantry system 10 includes a support structure 11 which employs a free-standing I-beam frame to locate a mounting beam 12 in a desired overhead position. Mounting beam 12 could alternatively be ceiling mounted. A guideway and rack 13 is suspended from mounting beam 12 and receives at least one carriage 14. In a preferred embodiment, guideway and rack 13 forms a continuous loop and a plurality of carriages 14 are provided.

Carriage 14 includes a carrier 15 having rollers engaged with guideway and rack 13 for movement along the loop. A rack-and-pinion encoder in carrier 15 engages guideway and rack 13 so that carriage 14 can determine its exact location at all times. Carrier 15 supports and controls a pair of "H" arms 16 and 17. A servomotor 18 provides a linear axis drive to create motion in three axes (x, y, and z dimensions). Arms 16 and 17 have end-of-arm clamps 20 and 21, respectively, with each containing a servo-controlled mechanism for grasping fixtures. "H" arms 16 and 17 may have a lifting capacity of about 120 kilograms, for example.

Carriage 14 also includes a carriage controller 22 which stores and implements all commands necessary to perform each of its assigned tasks, such as presenting a fixture to a particular machining station, removing a fixture from a particular machining station, conveying a fixture between machining stations, etc. Carriage controller 22 includes an RF transceiver 23 for communicating with a main system controller located remotely from gantry system 10. RF communication includes sending positional and status information from carriage controller 22 to the main controller and sending task commands from the main controller to carriage controller 22.

Gantry system 10 also includes an insulated conductor rail (not shown) for distributing electrical power to carriage 14 via a current collector (not shown). Other rails such as the guideway or mounting beam can be used to provide a ground return for the electric power.

Figure 3:
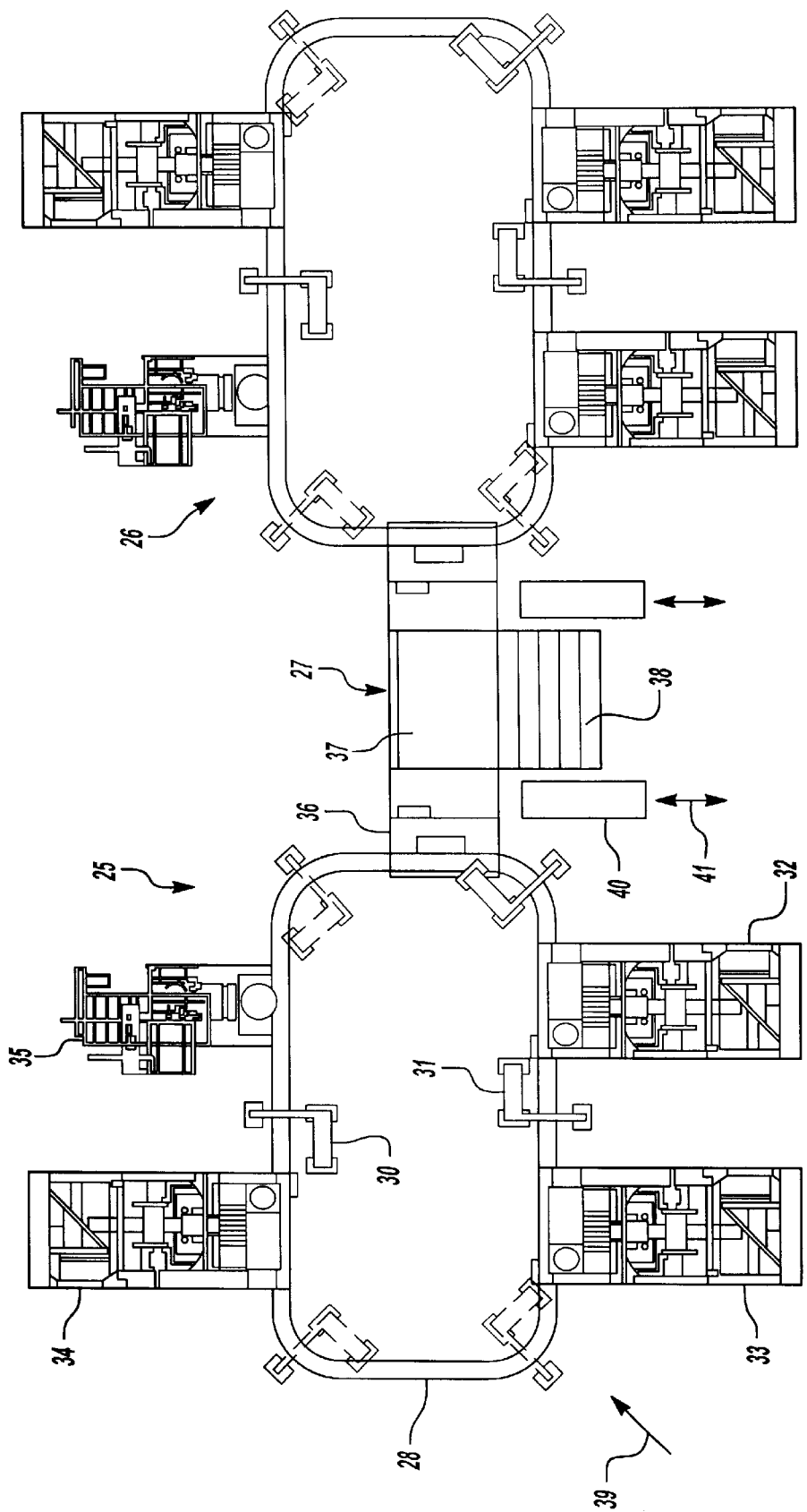
FIG. 3 is an aerial layout view of a manufacturing line according to the present invention and using a monorail loop.

FIG. 3 shows two complete manufacturing loops according to the invention. A first manufacturing loop 25 is arranged to perform a sequence of predetermined machining operations in order to manufacture a workpiece into a desired product. A second manufacturing loop 26 is deployed adjacent to loop 25, there being an operator station 27 disposed between the two loops. Loops 25 and 26 are shown as being substantially identical and could be used to manufacture identical products; however, the loops could also manufacture completely different products using similar or very different machining stations. Furthermore, each loop could be designed to manufacture more than one particular product simultaneously. Due to the similarities of loops 25 and 26, only loop 25 will be described in further detail.

Loop 25 includes a monorail 28 with a mounting beam, guideway and rack, and provision for electric power as discussed with reference to FIGS. 1 and 2. A pair of carriages 30 and 31 are mounted to monorail 28 for movement around the loop to operator station 27, CNC machines 32, 33, and 34, and a flex turret cell 35. Operator station 27 includes a loading/unloading bay 36 located proximate to monorail loop 28 where an operator loads and unloads workpieces on and off of fixtures that are delivered to bay 36 by carriages 30 and 31. Operator station 27 may also include a central platform 37 and stairway 38 for easy operator access to the bays and to a part delivery and removal system 40 which may include a conveyor system, overhead wire transfer, fork lifts, etc. Unfinished workpieces are delivered to and finished workpieces removed from operator station 27 as shown by arrow 41.

In a preferred embodiment, the layout of FIG. 3 employs a predetermined fixture design for carrying workpieces and a corresponding fixture-holder design in each machining station (i.e., CNC machines 32–34 and flex turret cell 35) so that each single workpiece remains affixed to the same fixture throughout the entire sequence of machining operations. Thus, a workpiece is loaded onto a fixture at bay 36 and automatically proceeds to the appropriate machining stations to accomplish the desired machining operations for the particular workpiece and is then automatically returned to bay 36 for removal from the fixture by the operator.

Figure 4:
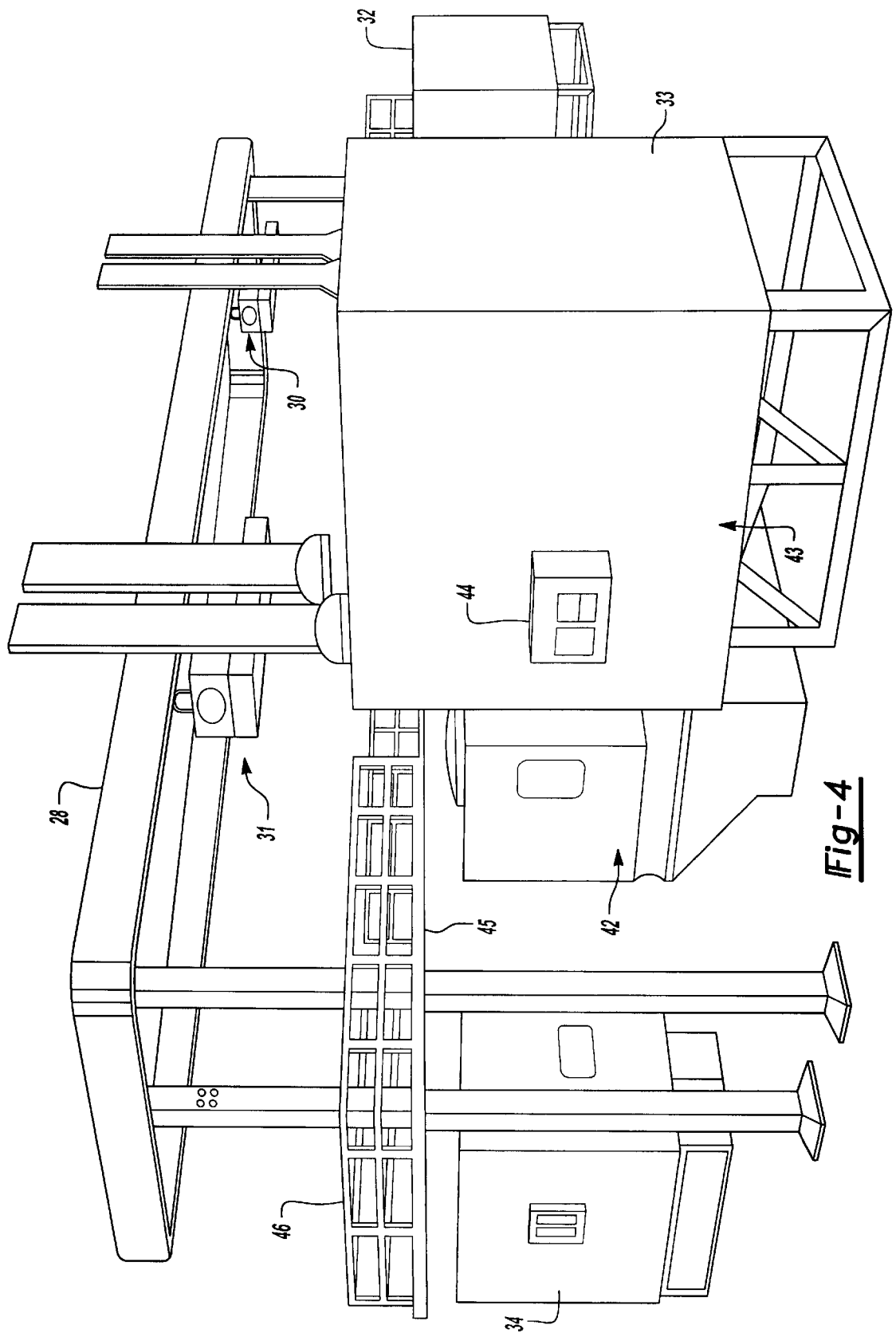
FIG. 4 is a perspective view of a portion of the manufacturing line of FIG. 3.

FIG. 4 is a perspective view along the sight line indicated by arrow 39 in FIG. 3. CNC machine 33 includes a table portion 42 and a tool portion 43. Table portion 42 is proximate to (e.g., beneath) the gantry system and has a top entry opening to receive fixtures from carriages 30 and 31. Fixtures a vertically delivered to a removed from a fixture table within the side enclosure walls of table portion 42. Tool portion 43 contains any conventional type of CNC machine. Control box 44 includes a microcontroller for controlling all actions of table portion 42 and tool portion 43 and for communicating (e.g., receiving commands and sending status information) with a main controller by direct wiring (not shown).

A preferred embodiment of the present invention employs a raised platform 45, preferably at about the height of the top entry openings of the machining stations (e.g., about 8 feet). Platform 45 increases the safety of persons moving about in the corresponding floor area and facilitates maintenance by allowing 360° access around all machines, even during normal production operation. A guard rail 46 may also be provided at the periphery of platform 45 to form a barrier around the area where the fixtures are conveyed between machining stations. As a consequence of these self-contained guarding features, the present invention can avoid the cost, loss of floor space, and inconvenience of perimeter fencing that is required by typical robotic cells.

Figure 5:
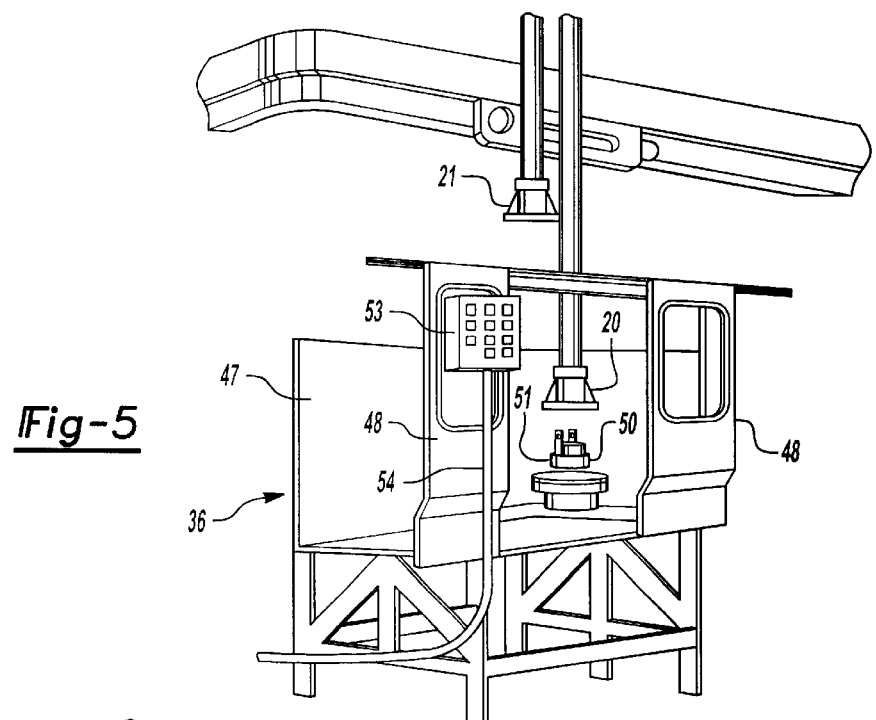
FIG. 5 is a perspective view of a portion of the operator station of FIG. 3.

Loading/unloading bay 36 of the operator station is shown in greater detail in FIG. 5 with the operator platform removed. An enclosure 47 has front sliding doors 48 through which an operator loads and unloads workpieces. A fixture holder 50 securably receives a fixture or transfer unit 51 during the loading or unloading of a workpiece. End-of-arm clamp 20 is shown released from fixture 51 although it would preferably remain connected during the unloading/ loading of workpieces. Depending upon the particular manufacturing process being implemented, end-of-arm clamp 21 may remain empty at the operator station so that it can first retrieve a fixture at the first machining station in sequence.

Loading/unloading bay 36 includes a control box 53 connected to a main controller via a wiring conduit 54. Control box 53 provides an interface between a human operator and the main controller allowing the operator to send status information and operational requests or commands.

Figure 6:
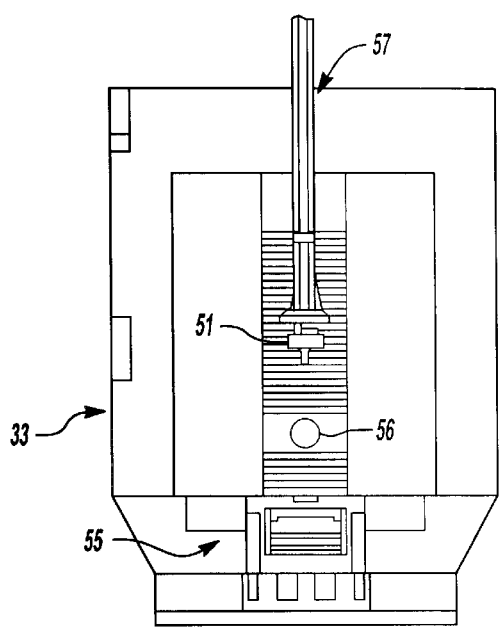
FIG. 6 is a front view of a CNC machine of the present invention with a front guard panel removed.
Figure 7:
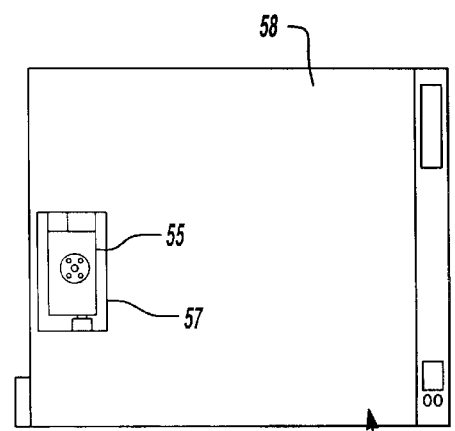
FIG. 7 is a top view of the CNC machine of FIG. 6.
Figure 8:
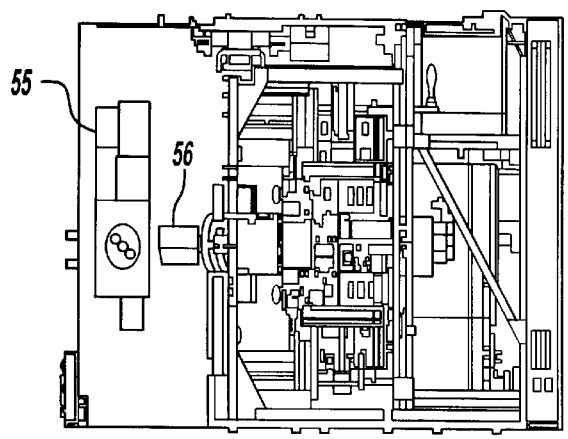
FIG. 8 is a top view of the CNC machine of FIG. 6 with a top panel removed.

CNC machine 33 is shown in greater detail in FIGS. 6–8. FIG. 6 is a front, partially cutaway view revealing a machining table 55 with means for securably receiving fixture 51. Once secured, fixture 51 is manipulated into a desired position for machining by automatic slewing of table 55. A CNC tool 56 then performs a commanded machining operation on a workpiece secured to fixture 51. A top entry opening 57 permits vertical access to table 55 by the gantry arm. FIG. 7 is a top view showing top entry opening 57 cut within a machine top plate 58. FIG. 8 is a top view with top plate 58 removed.

Figure 9:
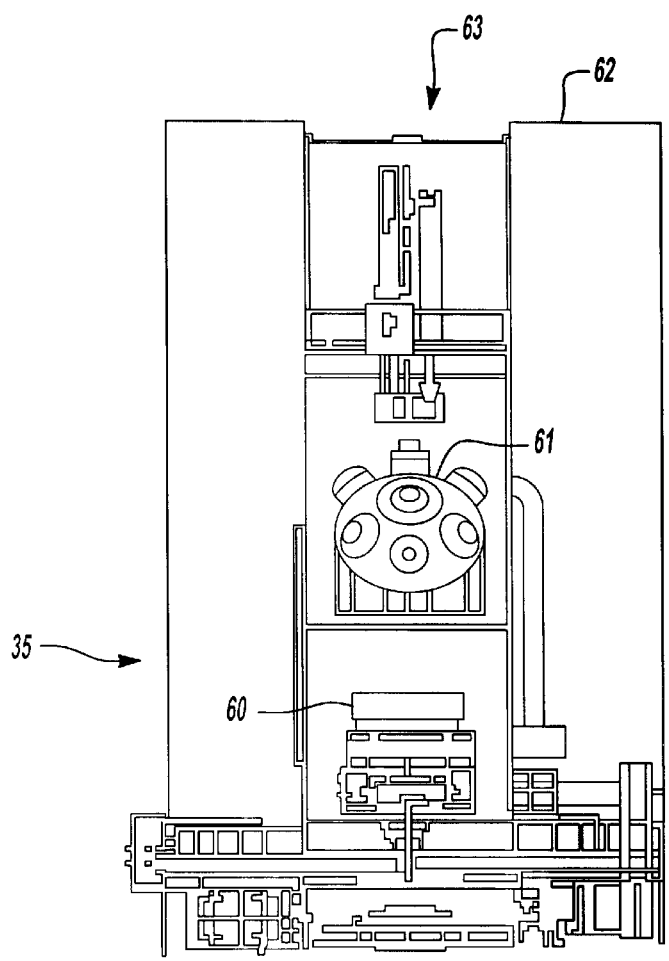
FIG. 9 is a front view of a flex turret machine used in a preferred embodiment.

Flex turret cell 35 is shown in greater detail by the front, partially cutaway view of FIG. 9. Cell 35 includes a fixture table 60 for receiving fixtures and presenting them to an indexing turret 61. Turret 61 preferable comprises a multi-faceted spindle nose wherein indexing of the spindle allows several different tools to be utilized on a workpiece without removal or reacquisition of a reference data point. Cell 35 has a top plate 62 with a top entry opening 63 for vertically receiving fixtures carried by the gantry arms.

Figure 10:
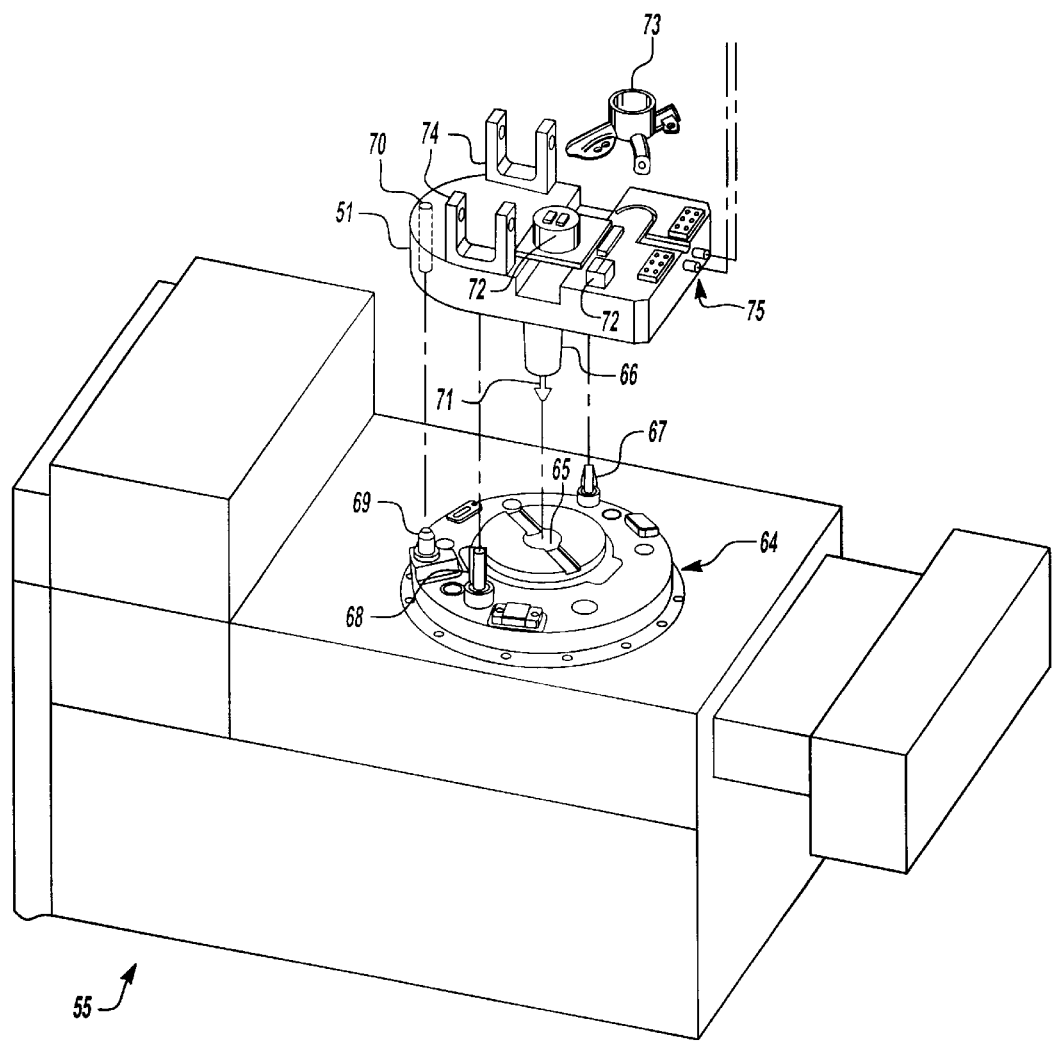
FIG. 10 is a partially exploded, perspective view of a fixture holder of a CNC machine and a fixture and workpiece.

Machining table 55 is shown in greater detail in FIG. 10. Table 55 can be based on a conventional table such as a Nikken NC. Depending upon the desired machining operations, table 55 can comprise a four-axis or five axis mechanized table. This conventional aspect of table 55 will not be described in detail.

In a preferred embodiment of the present invention, table 55 is specially adapted to receive fixtures vertically. Table 55 may also automatically secure the fixtures using a quick connect/disconnect mechanism as shown in FIG. 10 and more specifically described in co-pending U.S. application Ser. No. (docket 23197), which is hereby incorporated by reference.

Table 55 includes a fixture holder 64 having a central taper socket 65 for receiving a taper shank 66 projecting from the bottom of fixture 51. The taper of socket 65 and shank 66 guide fixture 51 into position as fixture 51 is lowered by the gantry arm. As shank 66 enters socket 65, rough alignment pins 67 and 68 approach and enter matching holes in fixture 51 (not shown), and then fine alignment pin 69 approaches and enters fine alignment hole 70 in fixture 51 to accurately position fixture 51 on table 55. Fixture 51 is held in place by a drawbar actuated clamp mechanism (not shown) inside table 55 which locks onto locking tip 71.

A workpiece 73, such as a steering knuckle being machined, is held to fixture 51 by mechanical clamps 72. A pair of U-bars 74 are provided on fixture 51 for grasping by the gantry end-of-arm clamps. Fixture 51 also includes a set of fittings 75 which may include electrical fittings or pneumatic fittings for receiving electric power or compressed air for various robotic functions that might be performed within fixture 51, such as clamping or unclamping of a workpiece at the operator station. Connection to and disconnection from fittings 75 can be done in any known manner.

Figure 11:
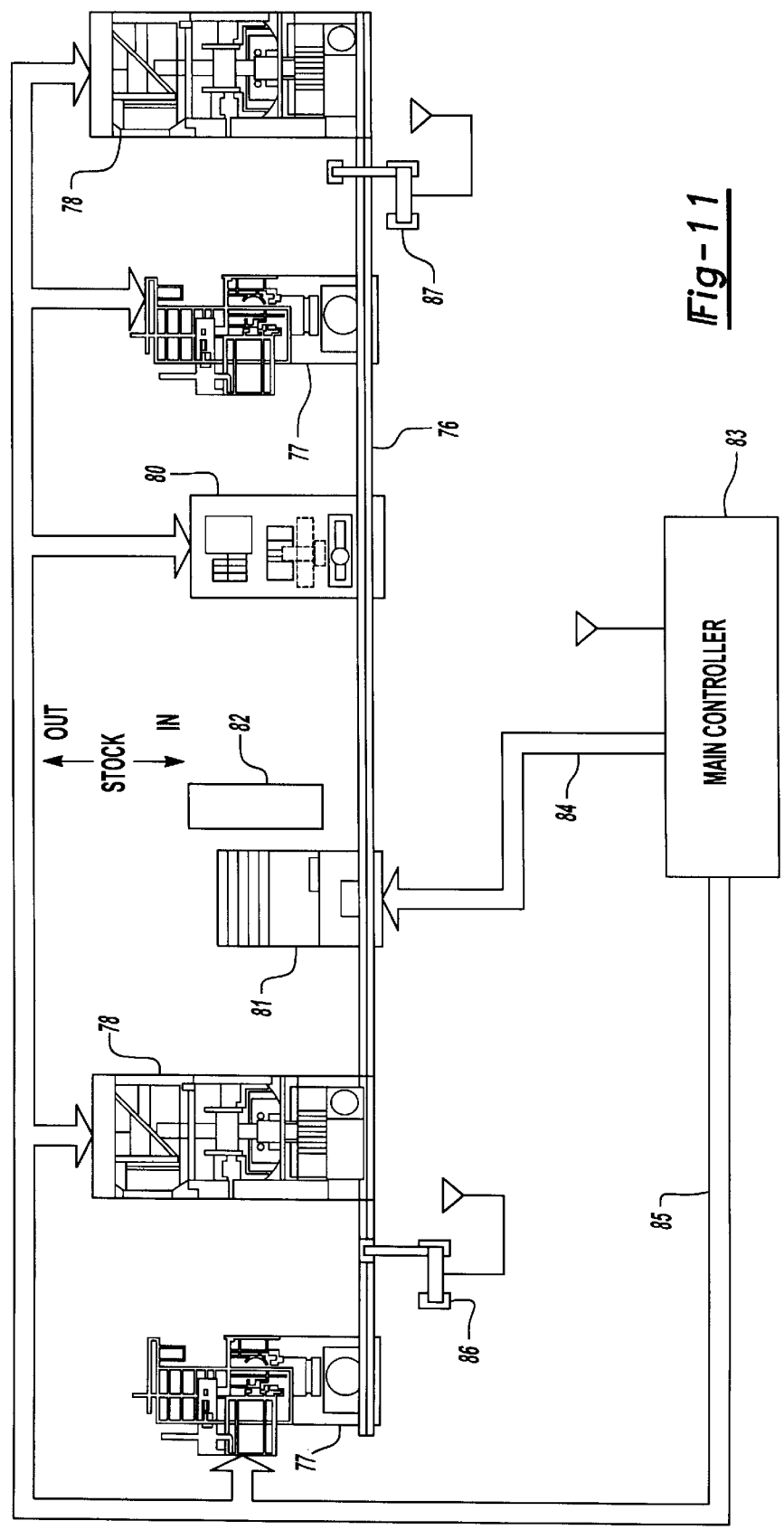
FIG. 11 is an aerial layout view of a manufacturing line according to the present invention and using a monorail line.

Overall system operation of the present invention, including coordination by a main controller, will now be discussed together with an alternative embodiment shown in FIG. 11. A monorail line 76 is supported overhead in a straight line proximate to a series of machining stations including turret cells 77, CNC machines 78, and a dedicated machining station 80. Dedicated machining station 80 lacks computer numeric control and is constructed to perform a specific set of machining operations only.

An operator station 81 is proximate monorail line 76 for loading and unloading workpieces onto fixtures as in the previous embodiment.

A main controller 83 is coupled to operator station 81 by a communication bus 84 and to each of the machining stations by a communication bus 85. Carriages 86 and 87 and main controller 83 each include respective radio-frequency transceivers for establishing an RF communication link using technology well known in the art. Main controller 83 can be any commercially available control system.

Main controller 83 coordinates machining operations and overall functioning of each element of the manufacturing system. Major functions within the control strategy include 1) registering each workpiece type, 2) determining the appropriate manufacturing steps to be performed for the workpieces, 3) commanding and coordinating carriages as they deliver workpieces from point to point, 4) monitoring current location and in-process progress of the workpieces, and 5) commanding machining stations to perform the appropriate tasks for workpieces being delivered to them.

Figure 12:
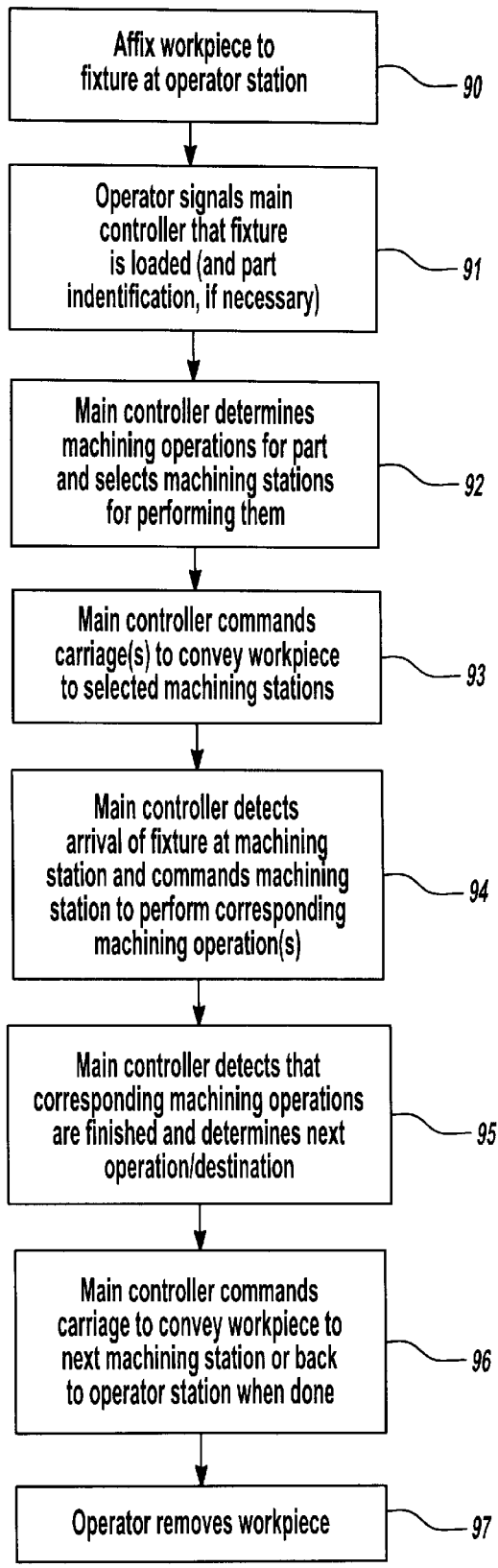
FIG. 12 is a flowchart of a preferred method for performing a sequence of machining operations on a workpiece.

More specifically, a preferred method of the invention is shown in FIG. 12. In step 90, an operator affixes a workpiece to a fixture at the operator station. In step 91, the operator activates a pushbutton or keypad on a control panel at the operator station to send a signal to the main controller to signify that a part is loaded on the fixture and is ready for the machining operations. If the manufacturing line is set up to have the ability to produce more than one specific finished part, then the operator might also generate a signal identifying which kind of workpiece and finished part are desired. Alternatively, the fixture may have automatic means for identifying the type of workpiece and then that information may be transmitted by the carriage to the main controller using the RF communication link.

In step 92, the main controller determines what machining operations to be applied to the workpiece to produce the finished part. It also determines which machining stations should be used and in what sequence to achieve the desired machining of the workpiece. The sequence of machining operations and the stations utilized may be a static, predetermined sequence. Alternatively, if the finished part is capable of being machined using various orders of operations and/or if there are more than one machining stations that could perform certain of the operations, then the main controller may also use an optimization strategy to determine a sequence for any particular workpiece on the fly.

Once the sequence of operations and stations is determined, the main controller commands the carriages to convey the workpiece to the selected machining stations in step 93. In step 94, the main controller detects the arrival of the fixture at a selected machining station and then commands the machining station to perform its corresponding machining operations. The machining station is preferably preprogrammed with each of the steps necessary to accomplish its assigned machining operations (e.g., grasping the fixture, moving the fixture table to present the workpiece to a tool, changing the tool if necessary, operating the tool, moving the table into an unloading position, and releasing the fixture once it is recovered by the carriage arm).

In step 95, the main controller detects that the machining operations to be performed at one machining station for a particular workpiece are finished (e.g., in response to a completion signal from the machining station) and determines the next machining station and corresponding machining operations that need to be performed on the particular workpiece. In step 96, the main controller commands a carriage to pick up and convey the workpiece to the next machining station, or if the machining operations are completed then back to the operator station. When the workpiece is returned to the operation station, it is removed by the operator in step 97. The operator returns the finished part to the inventory handling system and obtains a new unfinished workpiece for loading onto the fixture just vacated by the finished part.

Figure 13:
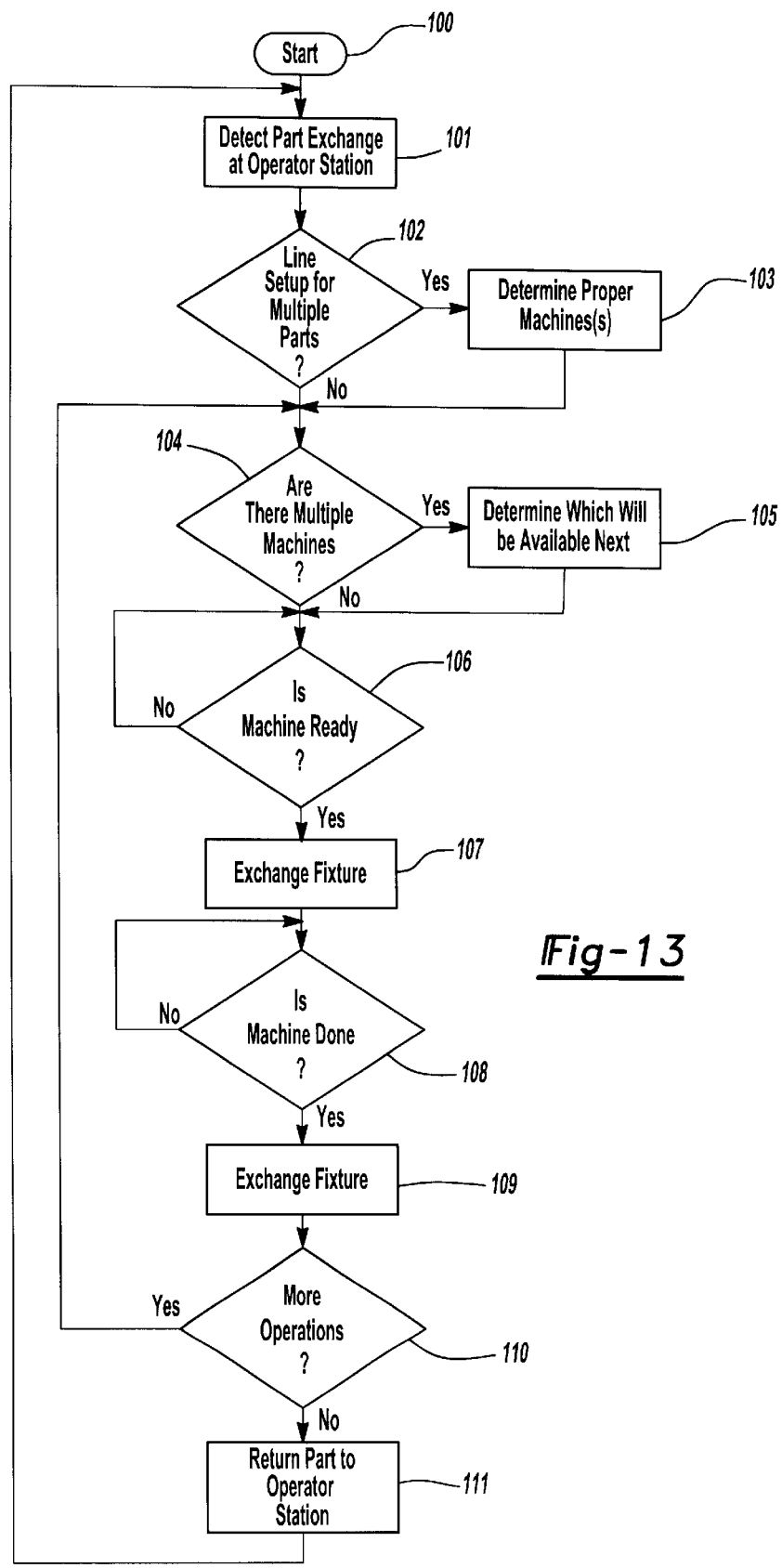
FIG. 13 is a flowchart showing decisions made by a main controller of the present invention.

The decision-making process used in the main controller corresponding to the progress of one particular fixture is shown in greater detail in FIG. 13. After starting at step 100, the main controller detects that a part exchange has occurred at the operator station in step 101. In step 102, the main controller checks whether the particular manufacturing line or loop has been set up to handle multiple parts of different designs. If yes, then the proper machines for processing this particular part are determined in step 103.

In step 104, the main controller checks whether there are multiple machines in the manufacturing line or loop that can be used for the processing of the particular part. If more than one are available, then a check is made in step 105 to determine which machine will be available next (i.e., first). In step 106, a check is made to determine whether the identified machine is ready to accept the fixture with the current part. If not, then the identified machine is rechecked until it is ready.

Once the identified machine is ready, the fixture is exchanged with (i.e., loaded onto) the machine in step 107 and then machining can begin. In step 108, the main controller checks to determine whether the machine is done with the part, and it continues to recheck until it determines that the part is done. Then the fixture is exchanged (i.e., removed) in step 109.

In step 110, the main controller determined whether more machining operations are needed for the particular part. If there are more operations to be done, then a return is made to step 104 to decide if more than one machine is available for the next processing operation. Otherwise, the part is returned to the operator station in step 111 and the process returns to step 101 for tracking the next part loaded onto the fixture at the operator station.

Turning now to FIGS. 14–17, a quick connect/disconnect fixturing system of the present invention is shown. Goals of any manufacturing system include fast cycle times and conformity with manufacturing tolerances. In the flexible manufacturing system of this invention, these goals necessitate fast placement and removal of fixtures while maintaining very accurate placement with respect to a reference position so that machining operations performed at different machining stations are consistent with one another. The fixturing system of the present invention is specially adapted to provide optimum performance in the flexible manufacturing system described. However, the fixturing system can be used to advantage in other machining applications and the examples provided herein are not intended to be limiting.

Figure 14:
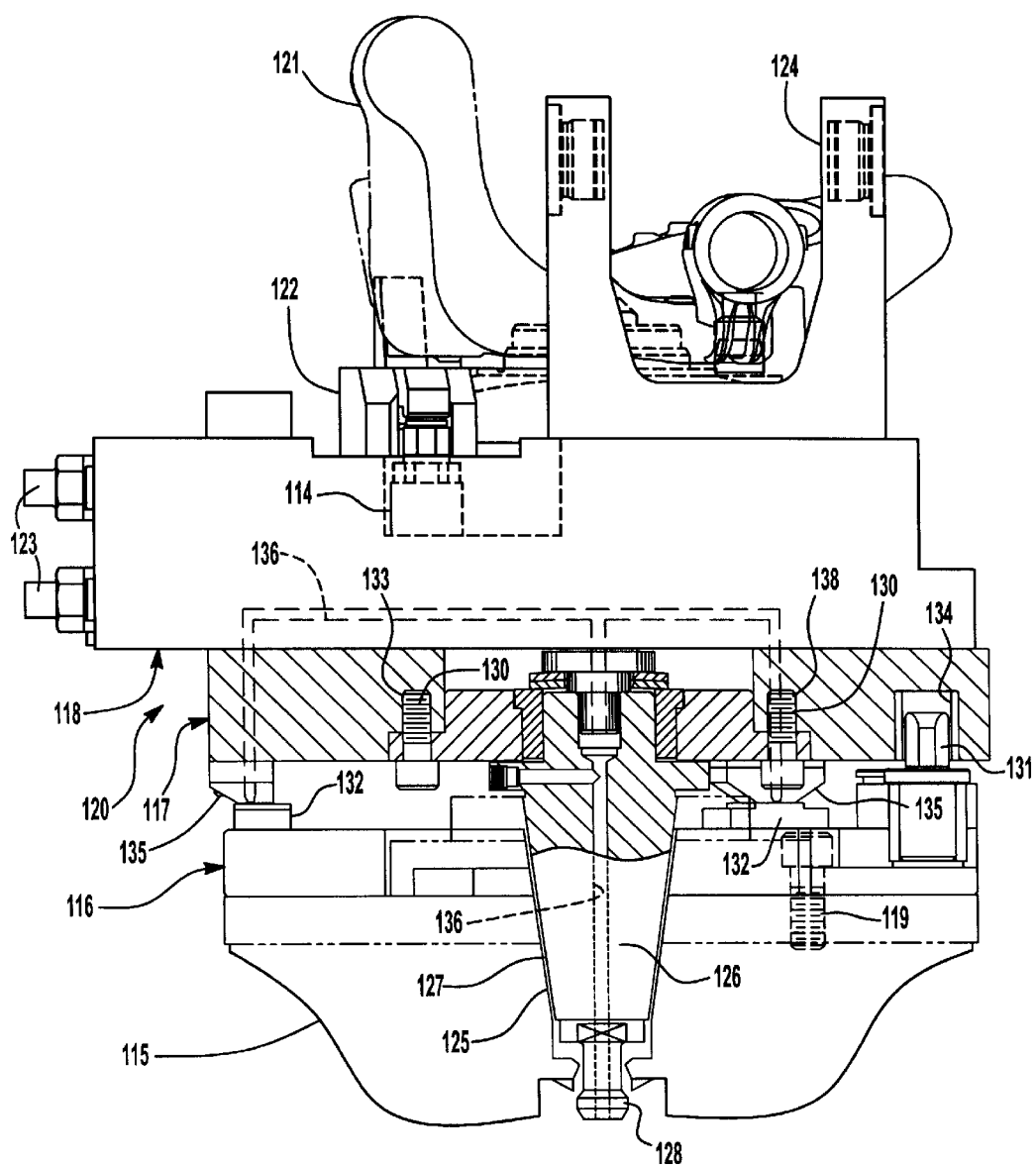
FIG. 14 is a side view of a transfer unit and machining table.
Figure 15:
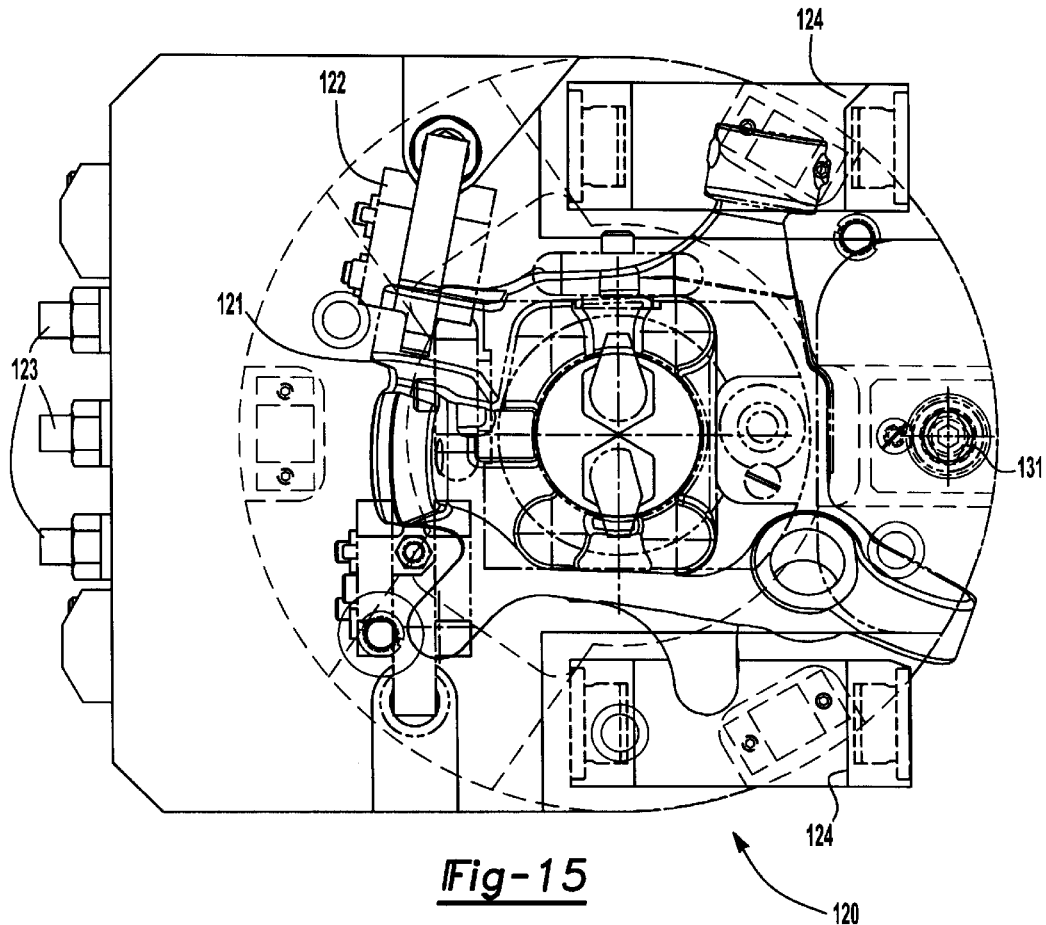
FIG. 15 is a top view of the transfer unit of FIG. 14.

As shown in FIGS. 14 and 15, machining table 115 has an adaptor plate 116 mounted on its top surface (attached by a bolt 119, for example). Adaptor plate 116 provides a convenient way to establish locating features for a reference position in relation to machining table 115, and allows for easy modification to conventional machining tables such as are available from Nikken Kosakusho Works, Ltd. and Matsumoto Machine Company, Ltd., for example. Alternatively, an adaptor plate could be eliminated if the locating features were integrated into table 115.

A transfer unit 120 includes a subplate 117 and a holding fixture 118. Subplate 117 carries locating features for mating with the locating features of adaptor plate 116. By providing a separate subplate and holding fixture, different holding fixtures designed for different manufactured workpieces can be developed more easily and at lower cost. Nevertheless, the functions of the subplate and the holding fixture could alternatively be integrated into a one-piece transfer unit.

Holding fixture 118 has a workpiece 121 mounted thereon by a clamp 122. Hydraulic ports 123 receive pressurized fluid which is delivered to a hydraulic actuator 114 for selectably opening or closing clamp 122 to attach or release workpiece 121. Typically, these actions would be done only at the operator station.

Holding fixture 118 also includes pick-up extensions 124 by which transfer unit 120 can be lifted and carried by the gantry system described above. Pick-up extension 124 may be comprised of a U-bar mounted to the top surface of holding fixture 118 with clamp receptacles provided at their distal ends.

Table 115 and adaptor plate 116 together form a trap or socket having a trap registration taper 125 for receiving a shank 126 extending from the bottom of transfer unit 120. Shank 126 has a shank registration taper 127 for mating with trap registration taper 125. The matching tapers provide the primary reference position for centering transfer unit 120 in the x-y plane (i.e., the horizontal plane of table 115).

Adaptor plate 116 also includes a pair of rough alignment pins 130 and a radial alignment pin 131 projecting from its top side. A plurality (preferably about three) z-axis locating pads 132 are mounted on the top side of adaptor plate 116. Subplate 117 includes rough alignment sockets 133, radial alignment socket 134, and a respective plurality (preferably three) z-axis locating pads 135. All z-axis locating pads have a flat surface of mating with the flat surface of the z-axis locating pads of the other structure.

Figure 16:
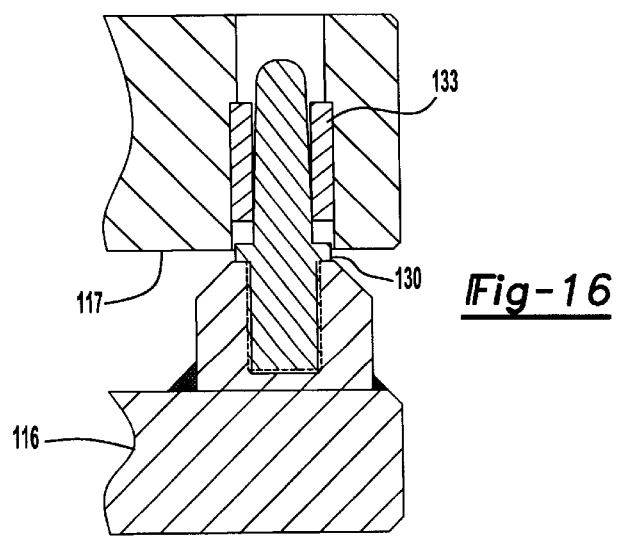
FIG. 16 is a side cross-sectional view along lines A—A of FIG. 15 showing rough alignment guides.

When transfer unit 120 is lowered toward table 115, rough alignment pins 130 are captured by rough alignment sockets 133. Pins 130 are narrowed at their ends as shown in FIG. 16 and guide transfer unit 120 toward the proper reference position. The reference position is determined according to 1) centering of the intersection of the central longitudinal axis of shank 126 in the horizontal x-y plane, 2) radial position or orientation in the x-y plane, and 3) vertical height along the z-axis. Preferably, the z-axis height is controlled at a plurality of points in order to ensure a flat placement in the x-y plane (i.e., no tilt).

Once the rough alignment features have begun to mate and x-y plane location is within a certain tolerance as transfer unit 120 continues to be lowered, radial alignment pin 131 engages radial alignment socket 134, thus establishing an accurate radial orientation. Transfer unit 120 then comes to rest when z-axis pads 135 on subplate 117 contact z-axis pads 132 on adaptor plate 116. A retention stud 128 at the distal end of shank 126 is captured and drawn downward to provide positive retention and alignment.

In a machining environment, the potential exists for the accumulation on table 115 of debris from machining operations. In order to prevent any debris from interfering with the mating of the z-axis locating pads, the present invention utilizes an air blow directed at pads 132 as transfer unit 120 approaches. An air passage 136 is formed as a bore or tunnel through retention stud 128, shank 126, and transfer unit 120, leading to exits in each z-axis locating pad 135. A source of pressurized air is provided within table 115 as is described below. Air passage 136 may include portions of both subplate 117 and holding fixture 118 or may be contained just within subplate 117.

Figure 17:
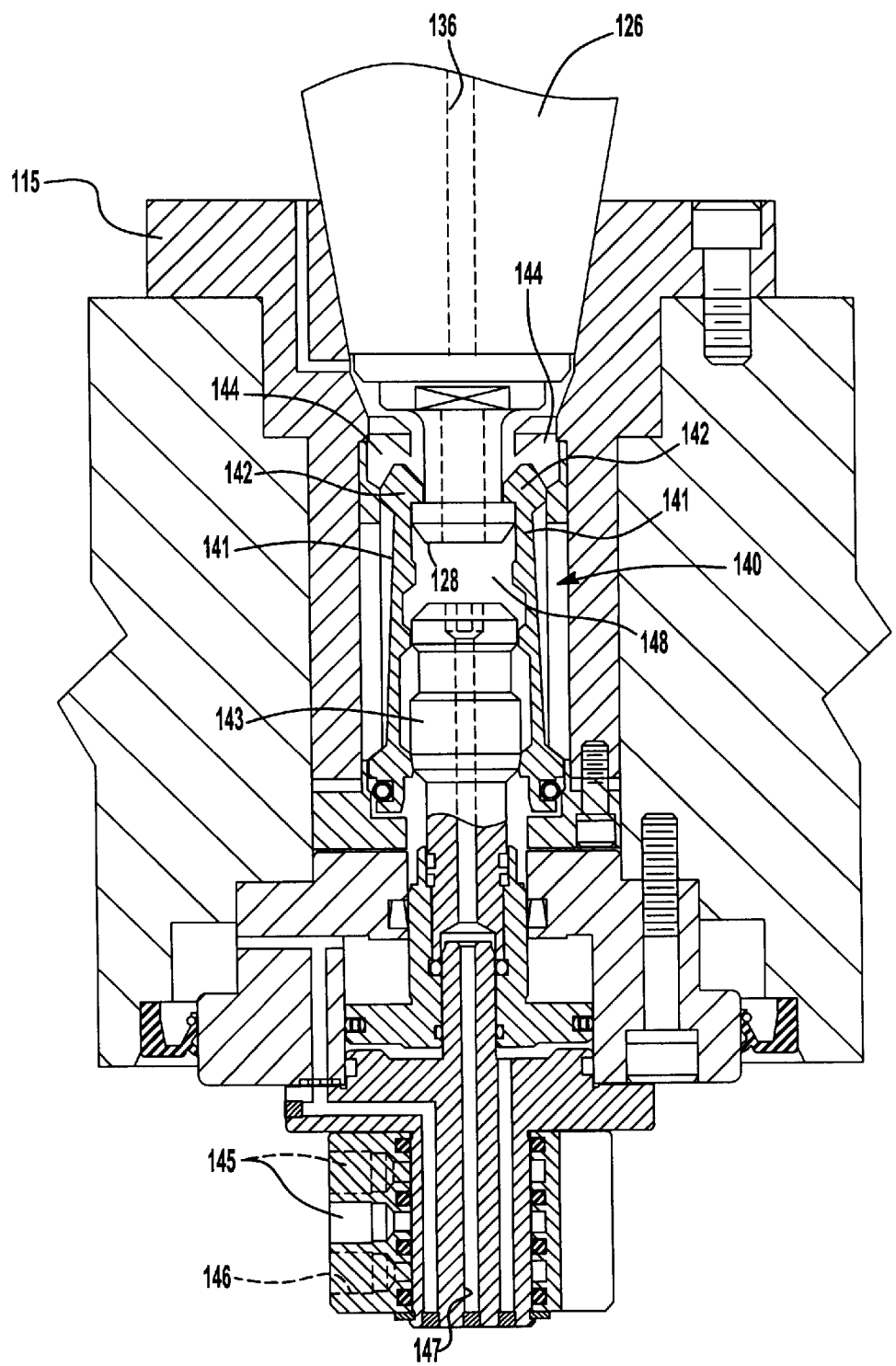
FIG. 17 is a side, partial cross-sectional view showing a machining table in greater detail.

FIG. 17 shows a retention mechanism 140 within table 115 for securing retention stud 128 and drawing down shank 126 for positive retention in the reference position. In this preferred embodiment, mechanism 140 is a drawbar system including lever arms 141 having catches 142 for grasping retention stud 128. A hydraulic piston 143 is coupled to lever arms 141 for moving them vertically in response to pressurized fluid introduced at hydraulic ports 145. As shown in FIG. 17, retention stud 128 is drawn downward into a secured position. To release retention stud 128, piston 143 and lever arms 141 are moved upward so that catches 142 withdraw into recesses 144 and retention stud 128 is allowed to exit retention mechanism 140.

An air port 146 receives a flow of pressurized air and supplies it to an air passage 147 extending through piston 143 into a cavity 148. When a transfer unit is not present at table 115, airflow into cavity 148 escapes to atmosphere. When shank 126 is gradually inserted into the trap, the path for escape to atmosphere becomes smaller and airflow is diverted into airflow passage 136. Due to the slope of the shank and trap registration tapers, diversion of airflow into passage 136 becomes significant even while the z-axis locating pads are well apart. Air flow is eventually cut off when the z-axis locating pads mate, thus closing off the exits from passage 136.

What is claimed is:

1. A quick-connect fixturing system for automated manufacturing comprising:
    a transfer unit for holding a workpiece including:
        a plate having a bottom side with a first radial locating feature and a first z-axis locating pad;
        a shank extending from said bottom side of said plate and having a retention stud, said shank having a shank registration taper;
        at least one clamp for holding said workpiece; and
        at least one pick-up extension by which said transfer unit is lifted and carried; and
    a machining table for securing said transfer unit at a machining station, said machining table including:
        a trap for receiving said shank and having a trap registration taper to mate with said shank registration taper;
        a second radial locating feature to mate with said first radial locating feature;
        a second z-axis locating pad to mate with said first z-axis locating pad; and
        a retention mechanism for securing said retention stud so that said transfer unit is located in a predetermined reference position.

2. The system of claim 1 wherein said plate is a subplate, wherein said transfer unit further includes a holding fixture mounted to a top side of said subplate, and wherein said holding fixture has said clamp mounted thereon.

3. The system of claim 2 wherein said holding fixture further has said pick-up extension mounted thereon.

4. The system of claim 1 wherein said transfer unit further comprises an airflow passage for receiving an airflow from said machining table, said airflow passage passing through said shank and having a termination for blowing said airflow against said second z-axis locating pad to clear debris.

5. The system of claim 4 wherein said airflow passage passes through said retention stud and wherein airflow from said machining table is forced into said airflow passage in said retention stud as said shank registration taper and said trap registration taper approach one another.

6. The system of claim 1 wherein said machining table includes an adaptor plate attached to a top surface of said machining table, said second radial locating feature and said second z-axis locating pad being mounted to said adaptor plate.

7. The system of claim 1 wherein said first and second radial locating features are comprised of a pin and a socket.

8. The system of claim 1 wherein said transfer unit includes a plurality of z-axis locating pads and said machining table includes a respective plurality of z-axis locating pads.

9. The system of claim 1 further comprising rough alignment guides on said transfer unit and said machining table for guiding said transfer unit into alignment as it is lowered onto said machining table.

10. The system of claim 1 wherein said transfer unit further includes a hydraulic actuator for operating said clamp to selectably attach or release a workpiece from said clamp.

* * * * *